(12) United States Patent
Yao et al.

(10) Patent No.: US 9,843,383 B2
(45) Date of Patent: Dec. 12, 2017

(54) MULTIFUNCTIONAL LASER DIODE DRIVING CIRCUIT, A MODULE COMPRISING THE SAME, AND A METHOD USING THE SAME

(71) Applicant: SOURCE PHOTONICS (CHENGDU) CO., LTD., Chengdu (CN)

(72) Inventors: Haijun Yao, Chengdu (CN); Yuanjun Huang, Chengdu (CN); Qiuming Wei, Chengdu (CN)

(73) Assignee: SOURCE PHOTONICS (CHENGDU) CO., LTD., Chengdu (CN)

( * ) Notice: Subject to any disclaimer, the term of this patent is extended or adjusted under 35 U.S.C. 154(b) by 36 days.

(21) Appl. No.: 14/760,995

(22) PCT Filed: Jul. 8, 2015

(86) PCT No.: PCT/CN2015/083516
§ 371 (c)(1),
(2) Date: Jul. 14, 2015

(87) PCT Pub. No.: WO2017/004798
PCT Pub. Date: Jan. 12, 2017

(65) Prior Publication Data
US 2017/0012701 A1 Jan. 12, 2017

(51) Int. Cl.
*H04B 10/071* (2013.01)
*H04B 10/077* (2013.01)
(Continued)

(52) U.S. Cl.
CPC ....... *H04B 10/0791* (2013.01); *H04B 10/071* (2013.01); *H04B 10/077* (2013.01);
(Continued)

(58) Field of Classification Search
CPC combination set(s) only.
See application file for complete search history.

(56) References Cited

U.S. PATENT DOCUMENTS

| 5,436,750 A | 7/1995 | Kawano |
| 6,915,076 B1 * | 7/2005 | Mittal .............. H04B 10/07955 375/317 |

(Continued)

FOREIGN PATENT DOCUMENTS

| CN | 102646917 A | 8/2012 |
| CN | 103050885 A | 4/2013 |

(Continued)

OTHER PUBLICATIONS

International Search Report and Written Opinion; International Searching Authority/CN dated Mar. 25, 2016; International Application No. PCT/CN2015/083516; 9 pages; International Searching Authority/State Intellectual Property Office of the P.R. China; Beijing, China.

(Continued)

*Primary Examiner* — David Payne
*Assistant Examiner* — Omar S Ismail
(74) *Attorney, Agent, or Firm* — Andrew D. Fortney; Central California IP Group, P.C.

(57) ABSTRACT

A multifunctional laser driving circuit, and an optical module and method of using the same, are disclosed. The circuit combines first and second optical signals having different functions to form a compound signal, and switches among the first optical signal, second optical signal and compound signal by enabling or disabling first and second laser drivers corresponding to the first and second optical signals. The circuit can provide functions to optical modules, including converting an electrical data signal into an optical data signal; converting an electrical line monitoring signal into an optical line monitoring signal; combining the optical data and line monitoring signals and synchronously transmitting them to a fiber; and providing an OTDR function. Relative to using external OTDR tools to detect line faults, the (Continued)

present circuit and method enables simple line connection, timely detection of lines faults, and low costs of implementation.

20 Claims, 3 Drawing Sheets

(51) Int. Cl.
*H04B 10/079* (2013.01)
*H04B 10/80* (2013.01)
*H04B 10/50* (2013.01)

(52) U.S. Cl.
CPC ..... *H04B 10/0795* (2013.01); *H04B 10/0799* (2013.01); *H04B 10/503* (2013.01); *H04B 10/801* (2013.01); H04B 2210/074 (2013.01)

(56) References Cited

U.S. PATENT DOCUMENTS

| | | | |
|---|---|---|---|
| 8,953,654 B2 | 2/2015 | Nakashima et al. | |
| 9,065,240 B2 | 6/2015 | Seidel et al. | |
| 2005/0041917 A1* | 2/2005 | Harres | H04B 10/0775 385/24 |
| 2005/0084202 A1* | 4/2005 | Smith | B82Y 20/00 385/14 |
| 2005/0249468 A1* | 11/2005 | Aronson | H04B 10/50 385/92 |
| 2008/0131114 A1* | 6/2008 | Jang | H04B 10/0771 398/13 |
| 2009/0116847 A1* | 5/2009 | Duan | H04B 10/077 398/137 |
| 2011/0236028 A1* | 9/2011 | Liu | H01S 5/0683 398/136 |
| 2012/0250707 A1* | 10/2012 | Lu | B23K 26/0084 372/25 |
| 2013/0094530 A1 | 4/2013 | Nakashima et al. | |
| 2013/0156417 A1* | 6/2013 | Chou | G02B 6/35 398/5 |
| 2015/0110139 A1 | 4/2015 | Seidel et al. | |

FOREIGN PATENT DOCUMENTS

| | | |
|---|---|---|
| CN | 104094485 A | 10/2014 |
| JP | 1140433 A | 6/1989 |
| JP | 5327082 A | 12/1993 |

OTHER PUBLICATIONS

Shi Ancun et al.; "Drive Circuit of Laser Source of Laser Projector"; Bibliographic data of CN102646917 (A); Aug. 22, 2012; http://worldwide.espacenet.com.

Mitsuo Kitamura et al.; "Semiconductor Laser Switching Method"; Bibliographic data of JPH05327082 (A); Dec. 10, 1993; 2 pages; http://worldwide.espacenet.com.

Tatsuya Narahara et al.; "Laser Driving Circuit"; Bibliographic data of JPH01140433 (A); Jun. 1, 1989; 2 pages; http://worldwide.espacenet.com.

* cited by examiner

FIG. 3

| Hardware Control | MCU Control | | Optical Signal |
|---|---|---|---|
| Tx_disable | Detection Enable | Data Enable | |
| 1 | N/A | N/A | Strength < -45 dBm |
| 0 | 1 | 0 | 100% Modulation Depth (OTDR Function) |
| 0 | 0 | 1 | Data Transmission Only (Communication Signal) |
| 0 | 1 | 1 | Communication & monitoring signals coexist with 20% Modulation Depth |

MULTIFUNCTIONAL LASER DIODE DRIVING CIRCUIT, A MODULE COMPRISING THE SAME, AND A METHOD USING THE SAME

FIELD OF THE INVENTION

The present invention relates to the field of optical communication, especially to a multifunctional laser diode (LD) driving circuit, an optical subassembly and an optical or optoelectronic transmission module and/or transceiver comprising the same, and a method of transmitting optical signals using the same.

DISCUSSION OF THE BACKGROUND

In optical communications, optical signals carry information. One objective of optical communication research and development is achieving multifunctional information transmission to the greatest extent possible. A laser (e.g., a laser diode) in an optical transmitter subassembly such as a TOSA, BOSA, etc., converts an electrical signal into an optical signal. At present, multifunctional information transmission is generally provided with simple structures and low costs in commercial optical communication technology.

In addition, maintaining effective and stable optical communication lines is also a significant objective. Optical fibers are used most often as a medium for transmitting light over a long distance. Therefore, once the fiber has breaking points or does not work properly, precise diagnosis of the type and location of faults is vital to effective and stable optical communication.

Optical transceivers are used to transmit and receive optical signals over an optical fiber. Conventionally, optical communication line detection was often implemented using an optical time-domain reflectometer (OTDR). An OTDR is an optoelectronic instrument used to characterize the optical fiber. An OTDR is the optical equivalent of an electronic time domain reflectometer. It injects a series of optical pulses into the fiber under test and, at the same end of the fiber, extracts light that is scattered (Rayleigh backscattering) or reflected back from various points along the fiber. The scattered or reflected light that is extracted by the OTDR is used to characterize the optical fiber. In this way, the type and location of faults of the fiber can be determined.

Currently, OTDR tools are professional tools for fault diagnosis. Accordingly, the usage of OTDR-based tools is limited, and the cost is relatively high. Also, such tools may have complicated circuit structures, and generally cannot provide in-time fault monitoring or timely detection of such faults. So, an optical network operator generally cannot make decisions or determine fault locations at an ideal time to take actions to remove the fault and restore effective and stable communication.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention is intended to overcome one or more deficiencies in the prior art, and provide a multifunctional laser driving circuit, an optical subassembly including the same, an optical or optoelectronic module and/or transceiver including the same, and a method of using the same. In various embodiments of the present invention, two signals with different functions can be combined into one compound optical signal, and the compound optical signal is transmitted on a single optical transmission medium or communication line. Each of the two signals can also be transmitted as an optical signal at different times. Meanwhile, switching between the different signals can be achieved by driving (e.g., controlling the on and off states of) a laser that transmits the optical signals with electrical signals corresponding to the two signals. Generally, the laser is a laser diode (LD).

The design of the present laser driving circuit enables a simple line connection (e.g., using conventional optical fiber connectors) and a low cost implementation. The present invention can thus achieve a multi-functional or compound optical signal that combines a line monitoring signal and a regular data signal, and provide at least the following functions: converting an electrical data signal into an optical data signal for transmission; converting an electrical line monitoring signal into an optical line monitoring signal; combining the optical line monitoring signal with (e.g., superpositioning the optical line monitoring signal on) the optical data signal to form the multi-functional or compound optical signal; synchronously transmitting the multi-functional or compound optical signal to an optical fiber or other optical transmission medium; converting the line monitoring signal into a line detection signal; and testing the optical transmission medium (e.g., detecting one or more characteristics of, properties of, and/or faults in an optical fiber) with the line detection signal when the optical transmission medium does not work properly, or when a user or a network comprising the optical transmission medium instructs the laser driving circuit to detect faults in the optical transmission medium.

In order to achieve the present objective(s), in one respect, the present invention concerns a method of driving a laser in an optical or optoelectronic device such as an optical module, comprising driving the laser with a first electrical signal and/or a second electrical signal, generating a first optical signal when the laser is driven with the first electrical signal, generating a second optical signal when the laser is driven with the second electrical signal, generating a compound optical signal when the laser is driven with the first and second electrical signals, and transmitting the first optical signal, the second optical signal, and the compound optical signal over an optical transmission medium. The first optical signal and second optical signal are thereby combined into the compound signal, and transmission switching is achieved among the first optical signal, the second optical signal and the compound signal is achieved in this manner. The compound signal has both functions of the first and second optical signals, which results in a higher usage ratio of the optical fiber or other transmission medium, a lower cost, and a simple connection to the optical fiber. Users can be provided with multifunctional signal transmission when the first and second optical signals have different usages or functions.

In some embodiments, the first optical signal has a relatively high frequency, and the second optical signal has a relatively low frequency (i.e., the second frequency is less than the first frequency). As there is generally a significant difference between the frequencies of the two signals (e.g., at least a 5× or 10× difference), each of the signals can be properly recognized and separated at the receiver even when combined into compound information (e.g., a multi-functional signal).

In some embodiments, the first optical signal is a data or data communication signal, and the second optical signal is a line monitoring or line detection signal. The second optical signal can be converted from a line monitoring signal into a line detection signal (e.g., for detection of the properties and/or characteristics of, and/or faults in, an optical fiber) when the optical fiber does not work properly, or when a user or a network comprising the optical fiber instructs the laser driving circuit (or the controller in the laser driving circuit) to detect faults in the optical transmission medium. By combining the line monitoring signal with a regular data or data communication signal to form a compound signal, and controlling the laser driver(s) according to the line monitoring signal and the data signal, switching between different signals (or signal functions) can be achieved.

More specifically, a first laser driver is utilized to convert a data signal into a corresponding optical data signal, a second laser driver is utilized to convert a line monitoring signal into a corresponding optical monitoring signal, and then the optical data signal and the optical monitoring signal are combined into a compound signal and provided over the optical communication medium to a downstream device. The compound signal functions as both a regular data signal and a line monitoring signal. Switching among the optical data signal, optical monitoring signal and compound signal can be achieved by enabling or disabling each of the first laser driver and the second laser driver.

In some embodiments, a controller or control module (e.g., an MCU module) enables or disables the first laser driver and the second laser driver. The controller has multifunctional logic processing and control ability, which can be applied to corresponding instructions based on desired usage and/or the occurrence of one or more predetermined conditions.

A multifunctional laser driving circuit according to the present invention includes a signal transmitter module, a controller, a first laser driver, and a second laser driver, wherein the signal transmitter module is electrically connected with the controller, the first laser driver and the second laser driver, and the controller is further electrically connected with the first laser driver and the second laser driver. The signal transmitter module generally includes a laser (e.g., a laser diode), and may comprise a transmitter optical subassembly (TOSA).

The first laser driver is configured to drive the laser diode to convert a first electrical signal (e.g., an electrical data signal) into a first optical signal (e.g., a corresponding optical data signal). The second laser driver is configured to drive the laser diode to convert a second electrical signal (e.g., an electrical line monitoring signal) into a second optical signal (e.g., a corresponding optical monitoring signal). The first optical signal and the second optical signal are then combined into a compound signal. The controller enables or disables each of the first laser driver and the second laser driver to switch among the first optical signal, the second optical signal, and the compound signal. In some embodiments, instructions for controlling, switching and/or selecting an optical signal for transmission are stored in a register in the controller. When in use, the controller may retrieve such instructions in response to a control command from the user (e.g., through a host device) to enable or disable the first laser driver and the second laser driver.

Furthermore, the first optical signal may have a relatively high frequency, and the second optical signal may have a relatively low frequency signal. Also, the first optical signal may be a data signal, and the second optical signal may be a line monitoring signal or a line detection signal.

When such embodiments are in operation, the first laser driver is configured to convert an electrical data signal at high frequency from a signal transmitter module (e.g., an interface that electrically connects a host device to the optical or optoelectronic device) into an optical data signal and provide it to the laser (e.g., in a TOSA), and the second laser driver is configured to convert an electrical line monitoring signal at a low frequency from the signal transmitter module into a corresponding optical monitoring signal and provide it to the laser. The TOSA can combine the optical data signal and the optical monitoring signal into the compound signal and output the compound signal over an optical fiber or other optical transmission medium. Thus, the present invention can provide an optical or optoelectronic device with a mode in which both a regular optical data signal and a line monitoring signal can be combined into a single signal transmitted over a single fiber or other medium. The user (e.g., an optical line terminal [OLT] or optical network unit [ONU] optically connected to the optical or optoelectronic device) can recover the data signal and the line monitoring signal by decoding the compound signal. As a result, the present invention achieves both data transmission and line detection using a single signal.

Furthermore, when the fiber, line or other optical medium does not work properly, the network (or a user in the network) can disable the first laser driver via the controller, and detect the type and location of any faults in the optical fiber, line or other optical medium (in one embodiment, by increasing the output optical power) from the second laser driver and converting the line detection signal into a corresponding optical detection signal with the second laser driver and the laser. When the second optical signal is converted into a line detection signal, an OTDR function is achieved. Relative to line detection with external OTDR tools, the present invention enables OTDR with a simple (e.g., conventional) line or fiber connection, at a low cost, and with shorter response time.

In various embodiments, the modulation depth of the compound signal (e.g., the amplitude of the optical monitoring signal relative to the amplitude of the data signal) is from 5% to 50%. In order to retrieve the data signal and the line monitoring signal at the receiving end (e.g., the client side) of the optical transmission medium more efficiently, the modulation depth of the compound signal is set at 5%~50%. Such a signal has relatively high recognition during retrieval or recovery, and the recovered signal has reasonably high accuracy.

In some embodiments, signal transmission between the signal transmitting module and the controller complies with the IIC (I2C) communication protocol. For example, an IIC or I2C bus is a two-line serial bus, configured to connect the controller (e.g., a microcontroller) with peripheral devices or equipment in the optical or optoelectronic device. The IIC or I2C bus is also a multi-directional control bus that allows a plurality of chips, modules or functional blocks to connect to one bus, and each chip, module or functional block can be used as a control source to implement data transmission. In various embodiments of the present invention, an MCU and an optical transmitter module can both be used as a control source. In addition, the IIC or I2C bus takes less space than other buses (e.g., parallel buses), which results in less space on circuit boards and a smaller number of pins being used. Embodiments using an IIC or I2C bus reduce the cost of interconnections between various elements of the present optical or optoelectronic device, and can be broadly applied in optical communications.

Furthermore, the present invention provides a multifunctional optical module that contains the above-mentioned multifunctional laser driving circuit configured to provide the basic function of transmitting a high frequency data signal. With the present multifunctional laser driving circuit, the optical module can have also a function of transmitting a combination signal that includes both the data signal and a line monitoring signal, and a network including the multifunctional optical module can monitor the transmission over an optical line or fiber, based on the values, code and/or state of the line monitoring signal.

When the multifunctional optical module is in operation, and the optical fiber or line does not work properly or a user or network instructs the module to detect faults in the optical fiber or line, a network or user can detect an occurrence and/or location of one or more faults the optical fiber or line. For example, the network or user can increase the output optical power of the second laser driver (corresponding to the second optical signal) and change the function of the second optical signal from line monitoring to line detection. The second laser driver can then be used to transmit a line detection signal (e.g., for OTDR) to the laser, which then transmits the optical line detection signal to the optical fiber or line. The network or user then determines the type and location of the fault based on the feedback from the optical line detection signal. Relative to line detection with external OTDR equipment (as in the prior art), the present invention enables a simple line or fiber connection, a high integration level, a low cost implementation, and a timely line detection response.

Furthermore, the present invention provides a method for recovering the first and second signals from a multifunctional optical signal (e.g., the combined optical signal). The second signal (e.g., the optical monitoring signal or the line detection signal) is retrieved or recovered by determining or detecting the average optical power of the combined signal at the client side of the fiber. In general, the first signal (e.g., the data signal) of the combined signal is recognized as having a high frequency in optical communications. As a result, the device receiving the combined optical signal (e.g., at the client side) identifies the low frequency second optical signal in the combined optical signal by determining or detecting the average optical power of the combined optical signal. The device receiving the combined optical signal then retrieves or recovers the optical data signal (e.g., by subtracting the monitoring signal) from the combined optical signal. In this way, the retrieved or recovered signals have high accuracy and are easy to obtain.

Furthermore, the present invention provides a method for multifunctional optical signal using a laser driving circuit. The method involves switching among three signal transmission modes or functions using the above-mentioned laser driving circuit. When only regular data communication or signal transmission is required, an instruction or command (e.g., a complementary state of an enable signal, or a disable signal) is sent to the second laser driver (e.g., from an MCU), then the optical monitoring signal transmission function is disabled, and the laser (e.g., in the TOSA module) receives and transmits only the data signal.

Furthermore, the controller (e.g., the MCU) can send an instruction (e.g., a control or enable signal) to disable the first laser driver when the line monitoring signal indicates a fault condition in the optical fiber, such as when there are one or more breaking points in the optical fiber. If the signal received at the receiver (e.g., the client side) is abnormal, the controller can disable the first laser driver to turn off optical data signal transmission. The function of the second optical signal is then changed from line monitoring to line detection (e.g., by increasing the optical output power for the second laser driver and/or the second optical signal), the second laser driver sends a corresponding electrical line detection signal to the laser, which transmits a corresponding optical line detection signal over the optical transmission medium or communication line (e.g., optical fiber). Thus, the laser (e.g., in the TOSA) receives only the electrical line detection signal, and provides the optical line detection signal over the faulty fiber. Then, the optical detection signal is reflected back from the breaking points, so it only needs to detect the optical signal reflected back to determine the position where the fault(s) appear. In this way, maintenance measures can be taken to repair the breaking points in a timely manner and recover communication functions. This method provides the function of OTDR. Relative to using conventional external OTDR tools to achieve line detection, the present invention provides a lower cost solution and more timely detection, bringing improved functionality to optical transceivers (e.g., small form-factor pluggable [SFP] transceivers).

Furthermore, the detection accuracy of the OTDR function can be increased by regulating the frequency and/or amplitude of the electrical line detection signal when the optical line detection signal is transmitted over the fiber. Relative to the optical data signal, the optical line monitoring signal or optical line detection signal has a lower frequency. The frequency and/or amplitude of the line monitoring and line detection signals can be regulated as needed or desired to achieve the optimal detection sensitivity.

In addition, when breaking points arise in the optical transmission line, the type and/or position of the fault can be detected more conveniently by increasing the output strength (e.g., amplitude) of the line detection signal. As the line detection signal strength increases, the strength of the signal reflected back from the breaking point(s) increases accordingly. Therefore, the signal can be recognized more easily, and the detection result becomes more reliable.

Even further, in the line detection, the controller may instruct the signal transmitter module (e.g., laser, TOSA, etc.) to increase the optical output power of any signal driven by the second laser driver, thereby increasing the output strength of the optical detection signal. In detecting the fault, as the TOSA module receives only the line detection signal, the strength of the optical detection signal increases so that the signal strength reflected back from the fault point increases accordingly. Therefore, the recognition of the above-mentioned signal is facilitated, and the detection result is also more reliable.

Relative to the prior art, the present invention has advantageous effects, including providing a method of driving or generating multifunctional optical signal using a laser. For example, a first optical signal is combined with a second optical signal to form a compound signal, and mode or signal transmission switching among the first optical signal, the second optical signal and the compound signal is achieved by independently enabling or disabling a first laser driver (that drives the first optical signal) and a second laser driver (that drives the second optical signal). Since the first and second optical signals have different functions, multifunctional signal transmission can be achieved with a simple (e.g., conventional) line connection, at a low cost. Using the present multifunctional laser driving circuit, a line monitoring signal can be combined with a regular data signal to form a compound signal, and the compound signal can be provided to a receiving device over an optical transmission medium.

The present circuit, devices and methods can provide an optical module or other optical or optoelectronic device with the following functions: converting electrical data signals into optical data signals; converting electrical line monitoring signals into optical monitoring signals; combining the optical line monitoring signal with the optical data signal and transmitting the combined signal synchronously to an optical fiber; and changing the line monitoring signal to a line detection signal when the line or fiber malfunctions (e.g., breaks); and achieving an OTDR function via the line detection signal. The controller manages switching among the three functions or signal transmission modes by enabling or disabling the laser drivers corresponding to the first and second optical signals. In one aspect, relative to the prior art that transmits only data signals, the method of the present invention achieves both regular data signal transmission and line monitoring with simple circuits and control modes, and also provides an OTDR function via line detection signals. Relative to using external OTDR tools to achieve line detection, the present invention provides a lower cost solution and more timely detection, bringing increased functionality to optical transmitters and transceivers.

BRIEF DESCRIPTION OF THE DRAWINGS

FIG. 3 is a table showing an exemplary control signal relationship for switching the function and/or mode of the optical signal in accordance with one or more embodiments of the present invention.

DETAILED DESCRIPTION

Figure 1:
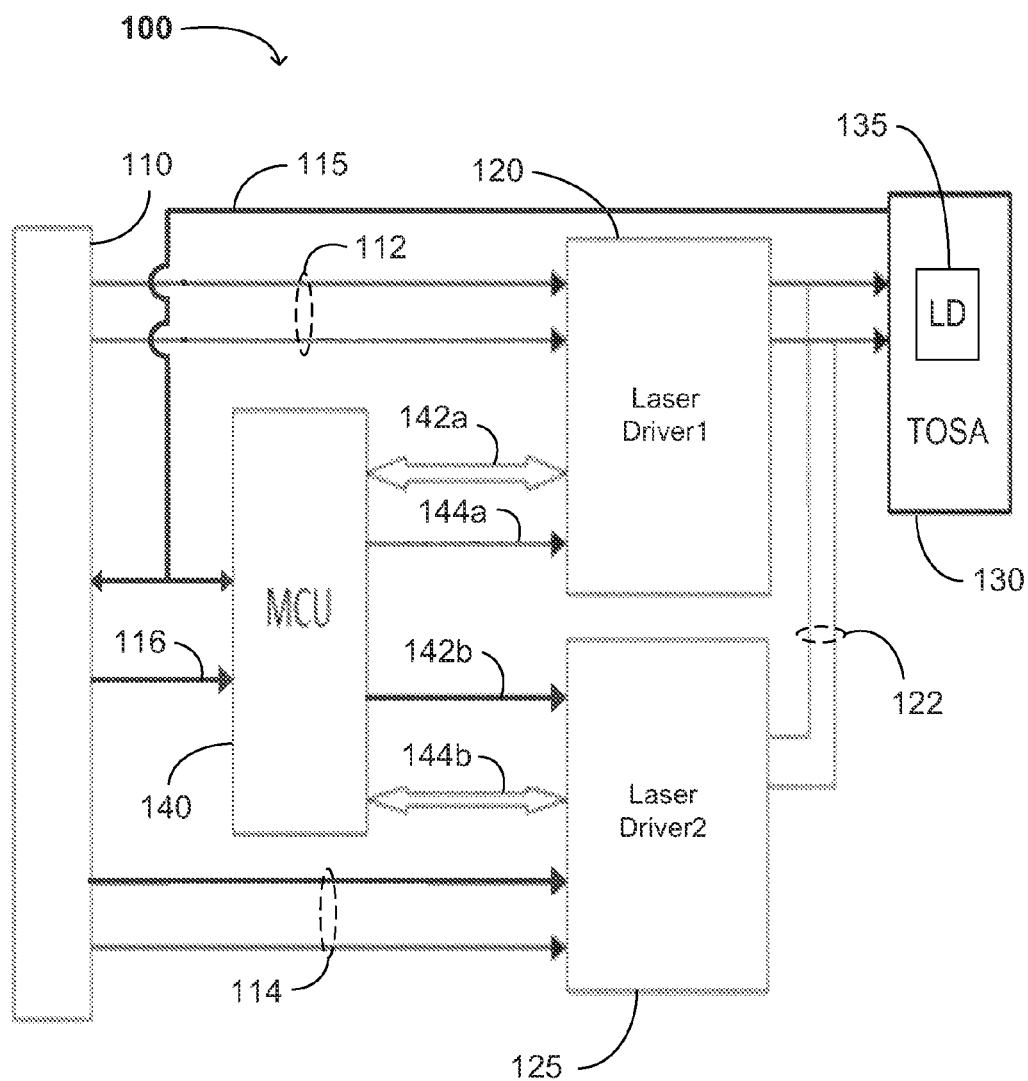
FIG. 1 is a block diagram showing an exemplary multi-functional optical signal transmission apparatus in accordance with one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the disclosure.

Some portions of the detailed descriptions which follow are presented in terms of processes, procedures, logic, functions, and other symbolic representations of operations on signals, code, data bits, or data streams within a computer, transceiver, processor, controller and/or memory. These descriptions and representations are generally used by those skilled in the data processing arts to effectively convey the substance of their work to others skilled in the art. A process, procedure, logic operation, function, process, etc., is herein, and is generally, considered to be a step or a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and/or otherwise manipulated in a computer, data processing system, optical component, or circuit. It has proven convenient at times, principally for reasons of common usage, to refer to these signals as bits, streams, values, elements, symbols, characters, terms, numbers, information or the like. It should be borne in mind, however, that all of these and similar terms are associated with the appropriate physical quantities and/or signals, and are merely convenient labels applied to these quantities and/or signals.

Unless specifically stated otherwise, or as will be apparent from the following discussions, it is appreciated that throughout the present application, discussions utilizing terms such as "processing," "operating," "calculating," "determining," or the like, refer to the action and processes of a computer, data processing system, or similar processing device (e.g., an electrical, optical, or quantum computing or processing device or circuit) that manipulates and transforms data represented as physical (e.g., electronic) quantities. The terms refer to actions and processes of the processing devices that manipulate or transform physical quantities within the component(s) of a circuit, system or architecture (e.g., registers, memories, other such information storage, transmission or display devices, etc.) into other data or information similarly represented as physical quantities within other components of the same or a different system or architecture.

Furthermore, in the context of this application, the terms "signal" and "optical signal" refer to any known structure, construction, arrangement, technique, method and/or process for physically transferring a signal or optical signal, respectively, from one point to another. Also, unless indicated otherwise from the context of its use herein, the terms "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use. Similarly, for convenience and simplicity, the terms "time," "rate," "period" and "frequency" are, in general, interchangeable and may be used interchangeably herein, as are the terms "data," "bits," and "information," but these terms are generally given their art-recognized meanings.

For the sake of convenience and simplicity, the terms "optical" and "optoelectronic" are generally used interchangeably herein, and use of either of these terms also includes the other, unless the context clearly indicates otherwise, but these terms are generally given their art-recognized meanings herein. Furthermore, the term "transceiver" refers to a device having at least one receiver and at least one transmitter, and use of the term "transceiver" also includes the individual terms "receiver" and/or "transmitter," unless the context clearly indicates otherwise. Also, for convenience and simplicity, the terms "connected to," "coupled with," "communicating with," "coupled to," and grammatical variations thereof (which terms also refer to direct and/or indirect relationships between the connected, coupled and/or communicating elements unless the context of the term's use unambiguously indicates otherwise) may be used interchangeably, but these terms are also generally given their art-recognized meanings.

Various embodiments and/or examples disclosed herein may be combined with other embodiments and/or examples, as long as such a combination is not explicitly disclosed herein as being unfavorable, undesirable or disadvantageous. The invention, in its various aspects, will be explained in greater detail below with regard to exemplary embodiments.

An Exemplary Circuit and Transmitter

As shown in FIG. 1, a multifunctional laser driving circuit 100 includes a signal transmitter module (e.g., TOSA) 130, a controller (e.g., MCU) 140, a first laser driver 120, and a second laser driver 125. The signal transmitter module 130 is electrically connected with the controller 140, the first laser driver 120 and the second laser driver 125, and the controller 140 is further electrically connected with the first laser driver 120 and the second laser driver 125. The signal transmitter module 130 is electrically connected with the controller 140 via a bidirectional bus 115, which may be a two-wire inter-integrated circuit (IIC or I2C) bus. The first laser driver 120 and the second laser driver 125 drive the laser diode (LD) 135 in the signal transmitter module 130 over a unidirectional (one-way) bus 122. The bus 122 may carry a differential signal from each of the first laser driver 120 and the second laser driver 125. For example, the first laser driver 120 may send a data signal on bus 122, and the second laser driver 125 may send a line monitoring or line detection signal on bus 122. The bus 122 may also carry single-ended signals from the first and second laser drivers 120 and 125. The controller 140 is electrically connected with the first laser driver 120 via a bidirectional control and feedback bus 142a and a unidirectional enable/disable bus 144a. The enable/disable signal on the bus 144a may be a simple, one-bit digital signal. The controller 140 is electrically connected with the second laser driver 125 via a bidirectional control and feedback bus 142b and a unidirectional enable/disable bus 144b. The buses 142b and 144b and the control, feedback and enable/disable signals thereon may be functional and/or structural duplicates of the buses 142a and 144a and the control, feedback and enable/disable signals thereon.

The laser driving circuit 100 also includes an electrical interface 110, which transfers signals between the laser driving circuit 100 and an external device (e.g., a host device, such as an optical network terminal or an optical network unit, in an optical network). The interface 110 communicates with the MCU 140 and the TOSA 130 (e.g., via data signals and/or instructions) over the bidirectional bus 115. The interface 110 also sends an enable signal (e.g., a transmitter enable/disable signal) to the MCU 140. The interface 110 sends a first electrical signal (e.g., an electrical data signal) to the first laser driver 120 on bus 112 and a second electrical signal (e.g., an electrical line monitoring signal) to the second laser driver 125 on bus 114. The buses 112 and 114 may be differential (as shown) or single-ended.

The first and second laser drivers 120 and 125 are configured to drive the laser diode 135, which converts a first electrical signal from the first laser driver 120 into a first optical signal and a second electrical signal from the second laser driver 125 into a second optical signal (e.g., for transmission over an optical fiber or other optical transmission medium). The first optical signal and the second optical signal may be combined into a compound signal (e.g., for transmission over the optical fiber). In various embodiments, the electrical signals (e.g., on bus 122) corresponding to the first optical signal and the second optical signal may be synchronized and logically combined to form the compound signal. For example, the electrical signals corresponding to the first optical signal and the second optical signal may be stored in separate latches (not shown, but which may be at the output terminals of the first and second laser drivers 120 and 125) receiving the same timing signal, then passed through a logic gate, such as an AND gate (although other logic gates that combine the electrical signals in a manner in which the first optical signal and the second optical signal can be recovered at the receiving end of the optical transmission medium are contemplated).

Figure 2:
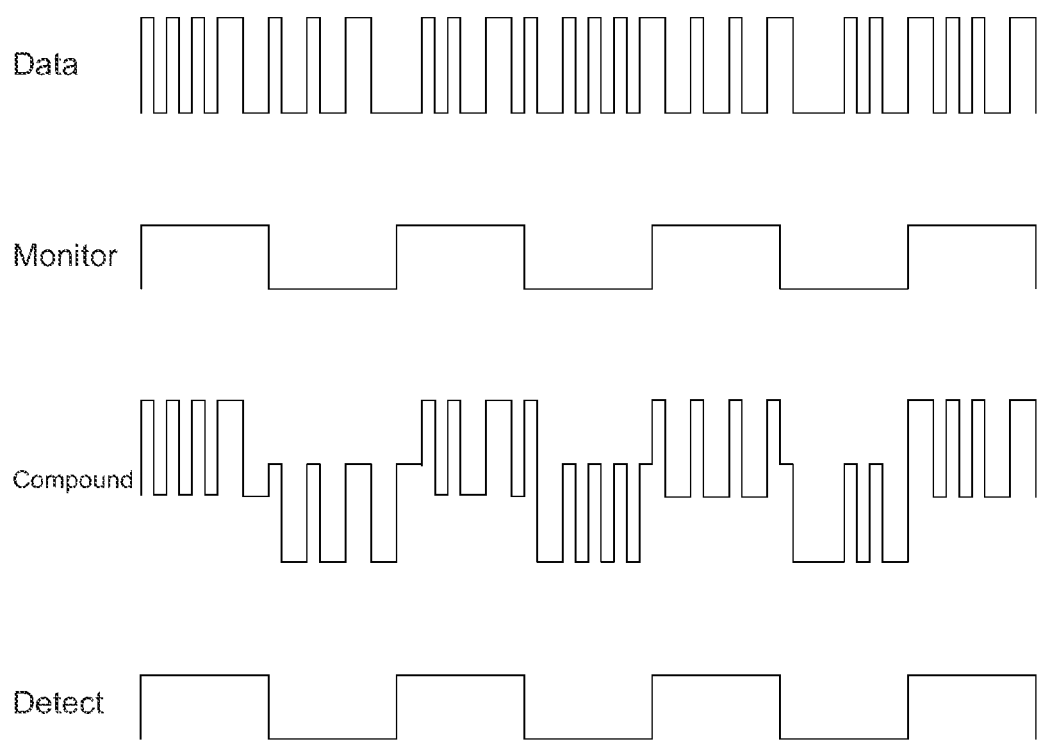
FIG. 2 is a waveform diagram showing an exemplary compound signal formed by a first optical signal at a high frequency and a second optical signal at a low frequency, in accordance with one or more embodiments of the present invention.

When the first laser driver 120 is enabled and the second laser driver 125 is disabled, only the first laser driver 120 drives the laser diode 135, which outputs a first optical signal (e.g., Data in FIG. 2). The first optical signal Data has a first, relatively high frequency. When the second laser driver 125 is enabled and the first laser driver 120 is disabled, only the second laser driver 125 drives the laser diode 135, which outputs a second optical signal (e.g., Monitor in FIG. 2). The second optical signal Monitor has a second, relatively low frequency. For example, the first frequency may be from 1 MHz to 1 THz (e.g., 10 MHz to 1000 MHz, or any value or range of values therein), and the second frequency may be from 1 kHz to 1 GHz (e.g., 100 kHz to 100 MHz, or any value or range of values therein), but the first frequency is always greater than the second frequency in such embodiments, for example by a factor of at least 5, 10, 20, 30, or any other number greater than 5.

In addition, the first optical signal may have a first, relatively high amplitude (e.g., power), and the second optical signal may have a second, relatively low amplitude (or power). For example, the second amplitude or power may be 5-50% of the first amplitude or power (e.g., 10-20%, or any other value or range of values therein).

When both the first laser driver 120 and the second laser driver 125 are enabled, both the first laser driver 120 and the second laser driver 125 drive the laser diode 135, which outputs a combined optical signal (e.g., Compound in FIG. 2). A device at the receiving end of the optical fiber (not shown) can relatively easily recover or extract the second optical signal by determining the average optical power of the received signal (e.g., Compound in FIG. 2).

However, when the network indicates that there is a fault in optical signal transmission (e.g., the device at the receiving end of the fiber does not receive the optical signal when it expects to receive the optical signal), or the network or a user (e.g., the host) otherwise instructs the laser driving circuit 100 to detect faults or breaks in the optical fiber, the second laser driver 125 is enabled and the first laser driver 120 is disabled, and the second laser driver 125 drives the laser diode 135 to output an alternative second optical signal (e.g., Detect in FIG. 2). The alternative second optical signal may have some or all of the same characteristics (e.g., frequency and power) as the second optical signal, but it has a function different from the second optical signal. For example, the alternative second optical signal may determine a number and/or location of faults or breaks in the fiber from the reflections of the alternative second optical signal (e.g., from a number of predetermined positions or locations in the fiber). The reflections are detected by optical signal receiving hardware (e.g., a photodiode and one or more amplifiers, such as a transimpedance amplifier [TIA]) elsewhere in the optical module (e.g., transceiver) containing the laser driving circuit 100. Alternatively, to improve the detection of the reflected optical signal, the optical output power of the alternative second optical signal can be increased relative to the second optical signal (e.g., by 2×, 5×, 10×, 20×, or any other value greater than 2×). In one example, the optical output power of the alternative second optical signal is the maximum output power permitted for the laser diode under the operating conditions of the laser driving circuit 100. In another example, the optical output power of the alternative second optical signal is about the same as the first optical signal.

Control instructions for signal function switching and/or signal transmission modes may be stored in a register in the controller 140. For example, FIG. 3 shows a truth table for the signal function switching and/or signal transmission modes of the laser driving circuit 100.

For example, when the transmitter disable signal Tx_disable 116 is active (e.g., has a logic high or binary "1" state), the first and second laser drivers 120 and 125 and the signal transmitter 130 are inactive (or powered down). As a result, the optical signal (if any) output by the signal transmitter 130 has a power or strength of substantially zero (e.g., <−45 dBm). However, when the transmitter disable signal Tx_disable 116 is inactive (e.g., has a logic low or binary "0" state), the first and second laser drivers 120 and 125 and the signal transmitter 130 are active (or powered up), and the laser driving circuit 100 can switch among the various optical signal functions and/or enter the various operational modes.

For example, when the line detection (or line monitor) enable signal 142b is active (e.g., has a logic high or binary "1" state) and the data enable signal 142a is inactive (e.g., has a logic low or binary "0" state), the second laser driver 125 is active and the first laser driver 120 is inactive. The laser driving circuit 100 then enters a line detection mode, and can perform an OTDR function as described herein. As described earlier, the amplitude of the optical signal in the line detection mode may be the same as the optical data signal or the maximum output power possible for an optical signal generated by the laser diode 135.

In addition, when the line detection (or line monitor) enable signal 142b is inactive (e.g., has a logic low or binary "0" state) and the data enable signal 142a is active (e.g., has a logic high or binary "1" state), the first laser driver 120 is active and the second laser driver 125 is inactive. The laser driving circuit 100 then enters a data communication mode, and can transmit an optical data signal as described herein.

Furthermore, when both the line detection (or line monitor) enable signal 142b and the data enable signal 142a are active (e.g., have a logic high or binary "1" state), both the first laser driver 120 and the second laser driver 125 are active. The laser driving circuit 100 then enters a combined function mode, and transmits a compound optical signal (including both the optical data signal and an optical line monitoring signal) as described herein. In this mode, the optical line monitoring signal may have an amplitude that is less than half of that of the optical data signal (and in one example, about 20% of the amplitude of the optical data signal), resulting in the compound signal having a modulation depth of <50% and in the one example, about 20%). The amplitude of both the optical data signal and the optical line monitoring signal can be modified, adjusted or changed to provide the compound signal with a desired or predetermined modulation depth.

An Exemplary Method of Transmitting a Compound Optical Signal

One aspect of the present invention involves a method of driving a laser, forming a multi-functional or compound optical signal, and/or transmitting the same over an optical fiber. In the present invention, two signals with different functions are combined into one compound signal and then transmitted over one optical communication line (e.g., optical fiber).

The method includes enabling or disabling driving the laser using first and second electrical signals, generating a first optical signal when the first electrical signal enables driving the laser, generating a second optical signal when the second electrical signal enables driving the laser, combining the first optical signal and the second optical signal into a compound signal, and outputting the first optical signal, the second optical signal, and the compound signal over an optical transmission medium. The compound signal may be generated when both the first electrical signal and the second electrical signal enable driving the laser. For example, the first optical signal may be transmitted when a first laser driver is enabled and a second laser driver is disabled, the second optical signal may be transmitted when the first laser driver is disabled and the second laser driver is enabled, and the combined signal may be transmitted when the first laser driver and the second laser driver are enabled.

The first optical signal may have a first frequency, and the second optical signal may have a second frequency significantly less than the first frequency, as described herein. Furthermore, the first optical signal may be a data signal, the second optical signal may be a line monitoring signal or a line detection signal, and the second optical signal may be the line detection signal when the optical transmission medium does not work properly, or a user or a network comprising the optical transmission medium instructs a transmitter comprising the laser to detect faults in the optical transmission medium. Thus, the method may further comprise driving the laser diode with the first laser driver according to an electrical data signal, and driving the laser diode with the second laser driver according to an electrical line monitoring signal. In general, the first and second laser drivers are enabled or disabled with a controller.

Additionally or alternatively, the method may further comprise recovering the second optical signal by detecting an average optical power of the second optical signal. Also, the method may further comprise regulating a frequency of the line detection signal to increase an accuracy of detecting the faults in the optical transmission medium, as described herein (e.g., by increasing an output strength, output power or amplitude of the line detection signal). In one example, increasing the output strength of the line detection signal comprises increasing an output power of the second laser driver.

CONCLUSION/SUMMARY

Embodiments of the present invention advantageously provide a multifunctional laser driving circuit and method of using the same. The laser driving circuit includes a first laser driver, a second laser driver, and a controller that enables or disables the first and second laser drivers to switch among the laser output modes or functions (e.g., data, line monitoring, combined data and line monitoring functions, or line detection). The multifunctional laser driving circuit and method can be implemented using conventional equipment, and offers a simple, low cost way to test for or detect breaks or faults in optical fibers. The present multifunctional laser driving circuit and method are applicable to optical devices, optical modules and optical communication devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of driving a laser diode (LD), comprising:
enabling or disabling driving the LD using first and second electrical signals and first and second laser drivers;
generating a first optical signal with the LD when the first electrical signal enables driving the LD, and generating a second optical signal with the LD when the second electrical signal enables driving the LD, wherein the first optical signal is transmitted when the first laser driver is enabled and the second laser driver is disabled, the second optical signal is transmitted when the first laser driver is disabled and the second laser driver is enabled, the first optical signal has a first frequency, and the second optical signal has a second frequency less than the first frequency;
combining the first optical signal and the second optical signal into a compound signal, wherein the compound signal is output when the first laser driver and the second laser driver are enabled; and
outputting the first optical signal, the second optical signal, and the compound signal from the LD over a same optical transmission medium.

2. The method of claim 1, wherein said first optical signal is a data signal, said second optical signal is a line monitoring signal or a line detection signal, and said second optical signal is said line detection signal when the optical transmission medium does not work properly, or a user or a network comprising the optical transmission medium instructs a transmitter comprising the LD to detect faults in the optical transmission medium.

3. The method of claim 2, further comprising regulating a frequency of the line detection signal to increase an accuracy of detecting the faults in the optical transmission medium.

4. The method of claim 2, further comprising increasing an output strength of the line detection signal.

5. The method of claim 4, wherein increasing the output strength of the line detection signal comprises increasing an output power of the second laser driver.

6. The method of claim 1, further comprising driving the laser diode with the first laser driver according to an electrical data signal, and driving the laser diode with the second laser driver according to an electrical line monitoring signal.

7. The method of claim 1, wherein said first and second laser drivers are enabled or disabled with a controller.

8. The method of claim 1, further comprising recovering the second optical signal by detecting an average optical power of the second optical signal.

9. A multifunctional laser driving circuit, comprising:
a signal transmitter module comprising a laser,
a controller electrically connected to said signal transmitter module,
a first laser driver receiving a first enable/disable signal from the controller and providing a first electrical signal to the laser, and
a second laser driver receiving a second enable/disable signal from the controller and providing a second electrical signal to the laser,
wherein said laser is configured to (i) convert said first electrical signal to a first optical signal when the first laser driver is enabled and the second laser driver is disabled, the first optical signal having a first frequency, (ii) convert said second electrical signal to a second optical signal when the first laser driver is disabled and the second laser driver is enabled, the second optical signal having a second frequency less than the first frequency, (iii) combine said first and second optical signals into a compound signal when the first laser driver and the second laser driver are enabled, and (iv) transmit the first optical signal, the second optical signal, and the compound signal over a same optical transmission medium.

10. The circuit of claim 9, wherein said first electrical signal is an electrical data signal, said second electrical signal is an electrical line monitoring signal, said first optical signal is an optical data signal, and said second optical signal is an optical line monitoring signal.

11. The circuit of claim 10, wherein said second optical signal is a line detection signal when an optical transmission medium configured to receive said optical data signal and said optical line monitoring signal does not work properly, or a user or a network comprising the optical transmission medium instructs the laser driving circuit to detect faults in the optical transmission medium.

12. The circuit of claim 9, said controller comprises a microcontroller.

13. The circuit of claim 9, wherein said signal transmitter module comprises a transmitter optical subassembly (TOSA).

14. The circuit of claim 9, wherein the compound signal has a modulation depth of from 5% to 50%.

15. The circuit of claim 9, further comprising an inter-integrated circuit (IIC or I2C)-compliant bus connected to the signal transmitting module and the controller, and configured to transmit signals between the signal transmitting module and the controller.

16. The circuit of claim 9, wherein the controller controls (i) transmission of the first optical signal by enabling the first laser driver and disabling the second laser driver, (ii) transmission of the second optical signal by disabling the first laser driver and enabling the second laser driver, and (iii) transmission of the combined signal by enabling the first laser driver and the second laser driver.

17. The method of claim 1, wherein the compound signal has a modulation depth of from 5% to 50%.

18. The method of claim 1, wherein the second frequency is at least ten times less than the first frequency.

19. The circuit of claim 9, wherein the second frequency is at least ten times less than the first frequency.

20. The circuit of claim 19, wherein the first frequency is from 1 MHz to 1 THz, and the second frequency is from 1 kHz to 1 GHz.